United States Patent
Oki et al.

(10) Patent No.: US 11,907,742 B2
(45) Date of Patent: Feb. 20, 2024

(54) SOFTWARE-DEFINED NETWORK ORCHESTRATION IN A VIRTUALIZED COMPUTER SYSTEM

(71) Applicant: VMware, Inc., Palo Alto, CA (US)

(72) Inventors: Brian Masao Oki, San Jose, CA (US); Venkata N. V. Mukkavilli, Newark, CA (US); Swapnil Dattatraya Tiwari, Santa Clara, CA (US); Vasantha K. Tammana, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 234 days.

(21) Appl. No.: 16/838,573

(22) Filed: Apr. 2, 2020

(65) Prior Publication Data

US 2021/0311760 A1 Oct. 7, 2021

(51) Int. Cl.
- G06F 15/16 (2006.01)
- G06F 9/455 (2018.01)
- H04L 12/46 (2006.01)
- H04L 12/66 (2006.01)
- G06F 9/54 (2006.01)

(Continued)

(52) U.S. Cl.
CPC .......... *G06F 9/45558* (2013.01); *G06F 9/547* (2013.01); *H04L 12/4679* (2013.01); *H04L 12/66* (2013.01); *H04L 41/20* (2013.01); *H04L 61/5007* (2022.05); *G06F 2009/45595* (2013.01)

(58) Field of Classification Search
CPC . H04L 12/4679; H04L 41/20; H04L 12/4641; G06F 9/5077
See application file for complete search history.

(56) References Cited

U.S. PATENT DOCUMENTS

| 8,572,679 | B1 | 10/2013 | Wang et al. |
| 9,276,816 | B1 * | 3/2016 | Conte ............ H04L 41/12 |

(Continued)

OTHER PUBLICATIONS

ESXSI: "vSphere 7 with Kubernetes and Tanzu on VMware Cloud Foundation," Mar. 10, 2020, ESXSI.com, Publication [online], Mar. 10, 2020 [retrieved Jul. 20, 2021], pp. 1-23. Retrieved from the Internet: <URL: https://esxsi.com/tag/kubernetes/>.

(Continued)

*Primary Examiner* — Hieu T Hoang
(74) *Attorney, Agent, or Firm* — Kim & Stewart LLP

(57) ABSTRACT

An example method of orchestrating a software-defined (SD) network layer of a virtualized computing system is described, the virtualized computing system including a host cluster, a virtualization management server, and a network management server each connected to a physical network, the host cluster having hosts and a virtualization layer executing on hardware platforms of the hosts. The method includes receiving, at the virtualization management server, a declarative specification describing a proposed state of an SD network for the host cluster, deploying, by the virtualization management server, virtualized infrastructure components in the host cluster in response to the proposed state in the declarative specification, and deploying, by the virtualization management server in cooperation with the network management server, logical network services supported by the virtualized infrastructure components in response to the proposed state in the declarative specification.

21 Claims, 11 Drawing Sheets

(51) Int. Cl.
*H04L 41/00* (2022.01)
*H04L 61/5007* (2022.01)

(56) References Cited

U.S. PATENT DOCUMENTS

| | | | | |
|---|---|---|---|---|
| 11,252,157 | B1* | 2/2022 | Khanna | G06F 9/5005 |
| 2015/0071110 | A1* | 3/2015 | Kothari | H04L 41/0663 |
| | | | | 370/254 |
| 2015/0103692 | A1* | 4/2015 | Jain | H04L 41/0806 |
| | | | | 370/254 |
| 2016/0224363 | A1* | 8/2016 | Joy | H04L 41/0806 |
| 2016/0254956 | A1* | 9/2016 | Xu | H04L 41/0886 |
| | | | | 370/255 |
| 2018/0034747 | A1* | 2/2018 | Nataraja | H04L 49/70 |
| 2018/0048537 | A1* | 2/2018 | Gaikwad | H04L 41/0896 |
| 2018/0101395 | A1* | 4/2018 | Aleksandrov | G06F 9/5077 |
| 2018/0159781 | A1* | 6/2018 | Mehta | H04L 45/16 |
| 2018/0165122 | A1 | 6/2018 | Dobrev | |
| 2019/0028342 | A1* | 1/2019 | Kommula | H04L 45/24 |
| 2019/0028345 | A1* | 1/2019 | Kommula | H04L 12/4675 |
| 2019/0036868 | A1* | 1/2019 | Chandrashekhar | H04L 45/021 |
| 2019/0171435 | A1 | 6/2019 | Pande et al. | |
| 2019/0229987 | A1 | 7/2019 | Shelke et al. | |
| 2019/0317751 | A1 | 10/2019 | Ramsay et al. | |
| 2020/0019468 | A1* | 1/2020 | Chinnam | H04L 61/2007 |
| 2020/0174845 | A1 | 6/2020 | Toeroe | |
| 2020/0233602 | A1* | 7/2020 | Li | G06F 3/067 |
| 2021/0089368 | A1* | 3/2021 | Goosen | H04L 41/20 |
| 2021/0165694 | A1 | 6/2021 | Nabi et al. | |
| 2022/0004417 | A1* | 1/2022 | Sinha | G06F 9/45558 |

OTHER PUBLICATIONS

Vmware, Inc. (Ramachandra et al.) "vCloud NFV Reference Architecture," VMware vCloud NFV 3.0, Dec. 31, 2018, Publication [online], 2018 [retrieved May 31, 2021], pp. 8-9, 15-18, 27-43, 52-75. Retrieved from the Internet: <URL: https://docs.vmware.com/en/VMware-vCloud-NFV/3.0/vmware-vcloud-nfv-30.pdf>.

International Search Report and Written Opinion dated Jul. 1, 2021 in corresponding International Application No. PCT/US2021/024412, 9 pages.

Benson, T. et al. "CloudNaaS: A Cloud Networking Platform for Enterprise Applications," Proceedings of the 2nd ACM Symposium on Cloud Computing (SOCC'11), Oct. 27-28, 2011, 13 pages.

Lee, B. "VMware vSphere management cluster role and benefits," 2019, 5 pages, Retrieved from: www.vembu.com/blog/vmware-management-cluster-design-and-benefits/.

Vmware, Inc. "NSX Upgrade Guide," Online Product Documentation for VMware NSX Data Center for vSphere ver. 6.4; selected sections, Front page: docs.vmware.com/en/VMware-NSX-Data-Center-for-vSphere/6.4/com.vmware.nsx.upgrade.doc/GUID-4613AC10-BC73-4404-AF80-26E924EF5FE0.html (Year: 2019), 7 pages.

Vmware, Inc. "NSX-T Data Center Upgrade Guide," VMware NSX-T Data Center 3.0, Apr. 7, 2020, 49 pages.

Non-Final Office Action dated Jul. 14, 2022 in U.S. Appl. No. 17/005,487, 20 pages.

Lee, Keith "PKS NSX-T Home Lab—Part 8: Configure NSX-T," Nov. 24, 2018, 20 pages, URL: keithlee.ie/2018/11/24/pks-nsx-t-home-lab-part-8-configure-nsx-t/.

Shaik, Chand B. "Prepare ESXi host as fabric Node in NSX-T," Jun. 22, 2018, 8 pages, URL: virtualbrigade.com/prepare-esxi-host-as-fabric-node/.

Smit, Martijn and Omkar Singh "VMware NSX-V Control and Management Plane Connections Diagram," Aug. 21, 2018, 3 pages, URL: lostdomain.org/2018/08/21/vmware-nsx-v-control-and-management-plane-connections-diagram/.

Non-Final Office Action dated Aug. 11, 2023 in U.S. Appl. No. 17/005,487, 14 pages.

* cited by examiner ns/a# SOFTWARE-DEFINED NETWORK ORCHESTRATION IN A VIRTUALIZED COMPUTER SYSTEM Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. Each host includes a virtualization layer (e.g., a hypervisor) that provides a software abstraction of a physical server (e.g., central processing unit (CPU), random access memory (RAM), storage, network interface card (NIC), etc.) to the VMs. The virtualization management server sits on top of the server virtualization layer of the SDDC, which treats host clusters as pools of compute capacity for use by applications.

An SDDC can also include a separate logical network layer that manages a large portion of software-defined networking ("SD networking") across the host clusters. The logical network layer treats the physical network as a pool of transport capacity that can be consumed and repurposed on demand. While the server virtualization layer deploys and manages Layer-2 (L2) and Layer-3 (L3) SD network infrastructure, the logical network layer provides a software abstraction of complete Layer-2 to Layer-7 (L2-L7) network services ("logical network services"), such as switching, routing, access control, firewalling, Quality of Service (QoS), load balancing, and the like. A network management server sits on top of the logical network layer to manage and control the logical network services. A network administrator ("network admin") interacts with the network management server to add, configure, reconfigure, remove, etc. logical network services across the host clusters.

The logical network layer of the SDDC is for the most part detached from the server virtualization layer, requiring a VI admin to manage server virtualization and a separate network admin to manage network virtualization. The virtualization management server and the network management server have separate and distinct user interfaces (UIs) and application programming interfaces (APIs). This can lead to a fractured experience for tenants of an SDDC when deploying and managing their applications.

SUMMARY

In an embodiment, a method of orchestrating a software-defined (SD) network layer of a virtualized computing system is described, the virtualized computing system including a host cluster, a virtualization management server, and a network management server each connected to a physical network, the host cluster having hosts and a virtualization layer executing on hardware platforms of the hosts. The method includes: receiving, at the virtualization management server, a declarative specification describing a proposed state of an SD network for the host cluster; deploying, by the virtualization management server, virtualized infrastructure components in the host cluster in response to the proposed state in the declarative specification; and deploying, by the virtualization management server in cooperation with the network management server, logical network services supported by the virtualized infrastructure components in response to the proposed state in the declarative specification.

Further embodiments include a non-transitory computer-readable storage medium comprising instructions that cause a computer system to carry out the above methods, as well as a computer system configured to carry out the above methods.

DETAILED DESCRIPTION

Figure 1:
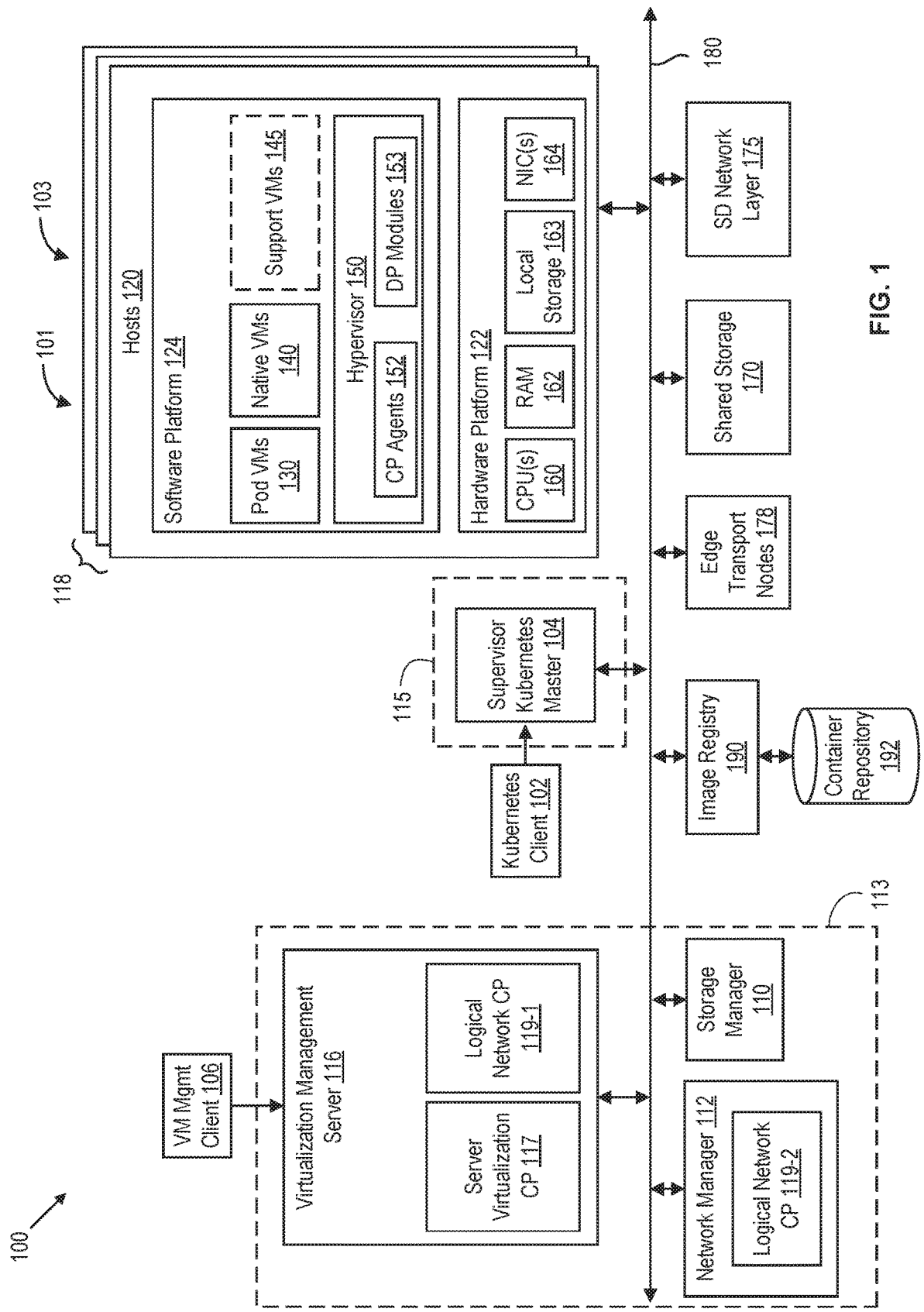
FIG. 1 is a block diagram of a clustered computer system in which embodiments may be implemented.

Software-defined (SD) network orchestration in a virtualized computing system is described. In embodiments described herein, a virtualized computing system includes a software-defined datacenter (SDDC) comprising a server virtualization platform integrated with a logical network platform. The server virtualization platform includes clusters of physical servers ("hosts") referred to as "host clusters." Each host cluster includes a virtualization layer, executing on host hardware platforms of the hosts, which supports execution of virtual machines (VMs). A virtualization management server manages host clusters, the virtualization layers, and the VMs executing thereon.

In embodiments, the virtualization layer of a host cluster is integrated with an orchestration control plane, such as a Kubernetes® control plane. This integration enables the host cluster as a "supervisor cluster" that uses VMs to implement both control plane nodes having a Kubernetes control plane, and compute nodes managed by the control plane nodes. For example, Kubernetes pods are implemented as "pod VMs," each of which includes a kernel and container engine that supports execution of containers. In embodiments, the Kubernetes control plane of the supervisor cluster is extended to support custom objects in addition to pods, such as VM objects that are implemented using native VMs (as opposed to pod VMs). A virtualization infrastructure administrator (VI admin) can enable a host cluster as a supervisor cluster and provide its functionality to development teams.

The SDDC includes a SD network layer across the host clusters. The SD network layer includes logical network services executing on a virtualized network infrastructure. The server virtualization platform manages the virtualized network infrastructure and, in cooperation with the logical network platform, manages the logical network services deployed on the virtualized network infrastructure. A VI admin interacts with the server virtualization platform for both server virtualization and network virtualization, as opposed to multiple admins interacting with two separate platforms. In embodiments, a virtualization management server includes a network management service that cooperates with a network management server (referred to as a "network manager") of the logical network platform to manage the lifecycle of logical network services thereof. The virtualization management server provides a common interface (e.g., user interface (UI) and/or application programming interface (API)) for managing compute, network, and storage.

In embodiments, the virtualization management server orchestrates the SD network layer based on a declarative specification. The declarative specification describes a proposed state of the SD network layer for host cluster(s). The virtualization management server then operates to bring the current state of the SD network layer to the proposed state defined in the declarative specification. The declarative specification reduces the number of configuration steps by allowing a VI admin or other service to describe the desired end-goal and letting the virtualization management server determine how to achieve that end-goal. The declarative specification is prescriptive using built-in dependency checks to reduce the potential for user error.

The techniques described herein allow the virtualization management server to orchestrate the entire lifecycle of the SD network layer, including: installing binaries; deploying VMs on hosts; configuring and unconfiguring the virtualized infrastructure supporting logical network services, upgrading the supporting virtualized infrastructure on demand, and performing automated backup, restore, and recovery of the supporting infrastructure from inevitable restarts and failures. The techniques further allow the virtualization management server to orchestrate the lifecycle of logical network services, including deploying, configuring, reconfiguring, and removing such logical network services. These and further advantages and aspects of the disclosed techniques are described below with respect to the drawings.

FIG. 1 is a block diagram of a virtualized computing system 100 in which embodiments may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 is a physical network that enables communication between hosts 120 and between other components and hosts 120 (other components discussed further herein).

In the embodiment illustrated in FIG. 1, hosts 120 access shared storage 170 by using NICs 164 to connect to physical network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (VSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi® hypervisor provided as part of the VMware vSphere® solution made commercially available by VMware, Inc. of Palo Alto, Calif. In the example of FIG. 1, host cluster 118 is enabled as a "supervisor cluster," described further herein, and thus VMs executing on each host 120 include pod VMs 130 and native VMs 140. Some native VMs 140, shown as support VMs 145, have specific functions within host cluster 118. For example, support VMs 145 can provide control plane or data plane virtualized infrastructure. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure.

Virtualization management server 116 is a physical or virtual server of a server virtualization platform that manages host cluster 118 and the virtualization layer therein. Virtualization management server 116 installs a control plane (CP) agent ("CP agent 152") in hypervisor 150 to add a host 120 as a managed entity. Virtualization management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in cluster 118 may be one or many. Virtualization management server 116 can manage more than one host cluster 118. As described further herein, virtualization management server 116 also orchestrates management of SD network layer 175 and all or a portion of shared storage 170.

In an embodiment, virtualization management server 116 further enables host cluster 118 as a supervisor cluster 101. Virtualization management server 116 installs additional CP agents 152 in hypervisor 150 to add host 120 to supervisor cluster 101. Supervisor cluster 101 integrates an orchestration control plane 115 with host cluster 118. In embodiments, orchestration control plane 115 is derived from Kubernetes. In supervisor cluster 101, hosts 120 become nodes for use by orchestration control plane 115. Virtualization management server 116 provisions one or more virtual servers as "master servers," which function as management entities in orchestration control plane 115. In the embodiment of FIG. 1, supervisor cluster 101 includes a supervisor Kubernetes master 104 that functions as such a master server. For purposes of clarity, supervisor Kubernetes master 104 is shown as a separate logical entity. For practical implementations, supervisor Kubernetes master 104 can be implemented as a support VM 145 (an optionally one or more pod VMs 130) in host cluster 118. Further, although only one supervisor Kubernetes master 104 is shown, supervisor cluster 101 can include more than one supervisor Kubernetes master 104 in a logical cluster for redundancy and load balancing. Although host cluster 118 in FIG. 1 is enabled as supervisor cluster 101, the SD network orchestration techniques described herein can be employed on host clusters 118 that are not so enabled.

In an embodiment, virtualized computing system 100 further includes storage manager 110. Storage manager 110 is a physical or virtual server that provisions virtual disks in shared storage 170 (or a VSAN formed from local storage 163) as independent objects. That is, virtual disks that persist apart from the lifecycle of any VM or container. Various components can interact with storage manager 110 to provision persistent storage, such as virtualization management server 116 and supervisor Kubernetes master 104. Storage manager 110 can operate independently from virtualization management server 116 (e.g., as an independent physical or virtual server). Alternatively, storage manager 110 can be a service in virtualization management server 116.

In an embodiment, virtualized computing system 100 further includes a network manager 112. Network manager 112 is a physical or virtual server of a logical network platform that manages logical network services of SD network layer 175. In an embodiment, network manager 112 comprises one or more virtual servers deployed by virtualization management server 116 as VMs. Network manager 112 and/or virtualization management server 116 installs additional control plane agents 152 and data plane (DP) modules 153 in hypervisor 150 to add a host 120 as a managed entity, referred to as a transport node. In this manner, host cluster 118 can be a cluster 103 of transport nodes.

In embodiments, the logical network platform of virtualized computing system 100 comprises three functions: management, control, and data. The management function provides an entry point of the logical network platform in the form of an API. The management function is responsible for performing operational tasks on the control and data functions. The control function computes the runtime state of the SD network layer 175 based on configuration from the management function. The control function is also responsible for disseminating topology information reported by the data function and configurations into components of the data function. The data function includes components of SD network layer 175 that perform stateless forwarding and transformation of packets based on tables populated by the control function. In the nomenclature used herein, the management and control functions of the logical network platform are performed by a logical network control plane 119, which includes software components in both virtualization management server 116 and network manager 112. That is, virtualization management server 116 includes a component 119-1, and network manager includes a component 119-2, of logical network control plane 119. In an embodiment, the management function is divided between components 119-1 and 119-2, whereas the control function is implemented entirely within component 119-2. The data function of the logical network platform is implemented in hypervisor 150 and support VMs 145. One example logical network platform that can be configured and used in embodiments described herein is a VMware NSX® platform made commercially available by VMware, Inc. of Palo Alto, Calif.

In embodiments, virtualized computing system 100 includes edge transport nodes 178. Edge transport nodes 178 are physical or virtual servers in SD network layer 175 (shown logically separate by way of example) that provide egress to, and ingress from, external networks. In embodiments, edge transport nodes are VMs (e.g., support VMs 145), formed into one or more logical clusters, which execute in one or more host clusters 118. Edge transport nodes 178 are discussed further herein.

Virtualization management server 116, network manager 112, and storage manager 110 comprise a virtual infrastructure (VI) control plane 113 for host cluster 118, shared storage 170, and SD network layer 175. Similar to the logical network platform, the server virtualization platform includes management, control, and data functions. The management and control functions are performed by a server virtualization control plane 117 executing in virtualization management server 116. A storage virtualization platform likewise can include management and control plane functions executing in virtualization management server 116 and/or storage manager 110.

In an embodiment, system 100 further includes an image registry 190 and a container repository 192. As described further herein, containers of supervisor cluster 101 execute in pod VMs 130. Containers are spun up from container images. Container images are registered with image registry 190, which manages a plurality of container repositories (one of which is shown in FIG. 1 as container repository 192) in which images of all containers registered with image registry 190 are stored. During registration of a container image, image registry 190 collects authentication information and during subsequent requests to access the registered container images, authenticates the requester using the collected authentication information. Once the requester is authenticated, image registry 190 permits the requester to fetch the container images registered to the requester.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, and the like. In embodiments, VI admin interacts with virtualization management server 116 through M management client 106 to provide a declarative specification describing a proposed state of SD network layer 175. In embodiments, VI admin interacts with virtualization management server 116 through VM management client 106 to perform other functions, such as enabling host cluster 118 as supervisor cluster 101, which in turn provide a declarative specification describing a proposed state of SD network layer 175 (e.g., a state necessary for operating a supervisor cluster).

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. In response, supervisor Kubernetes master 104 configures supervisor cluster 101 to match the desired state by creating pod VMs 130, creating native VMs 140, connecting VMs to storage and logical networks, destroying pod VMs 130 and native VMs 140, and the like. The resources can be deployed within the confines of supervisor namespaces. In this manner, the user interacts with supervisor Kubernetes master 104 to deploy applications in supervisor cluster 101 within defined supervisor namespaces.

As described herein, virtualization management server 116 orchestrates SD network layer 175 based on a declarative specification, which describes a proposed state of SD network layer 175 for host cluster 118. In embodiments, host cluster 118 is enabled as a supervisor cluster 101 described above and virtualization management server 116 orchestrates SD network layer 175 to provide an SD network configuration for supervisor cluster 101. In other embodiments, host cluster 118 is not enabled as a supervisor cluster 101. In such case, some components in FIG. 1 can be inactive and/or omitted, including Kubernetes client 102, supervisor Kubernetes master 104, image registry 190, container repository 192, and pod VMs 130. Virtualization management server 116 can orchestrate SD network layer 175 to provide an SD network for native VMs 140 executing in host cluster 118. While supervisor cluster 101 and a Kubernetes system are described in various examples herein, the SD networking orchestration techniques are not limited to such examples and are broadly applicable to virtualization systems having one or more host clusters in various configurations.

Figure 2:
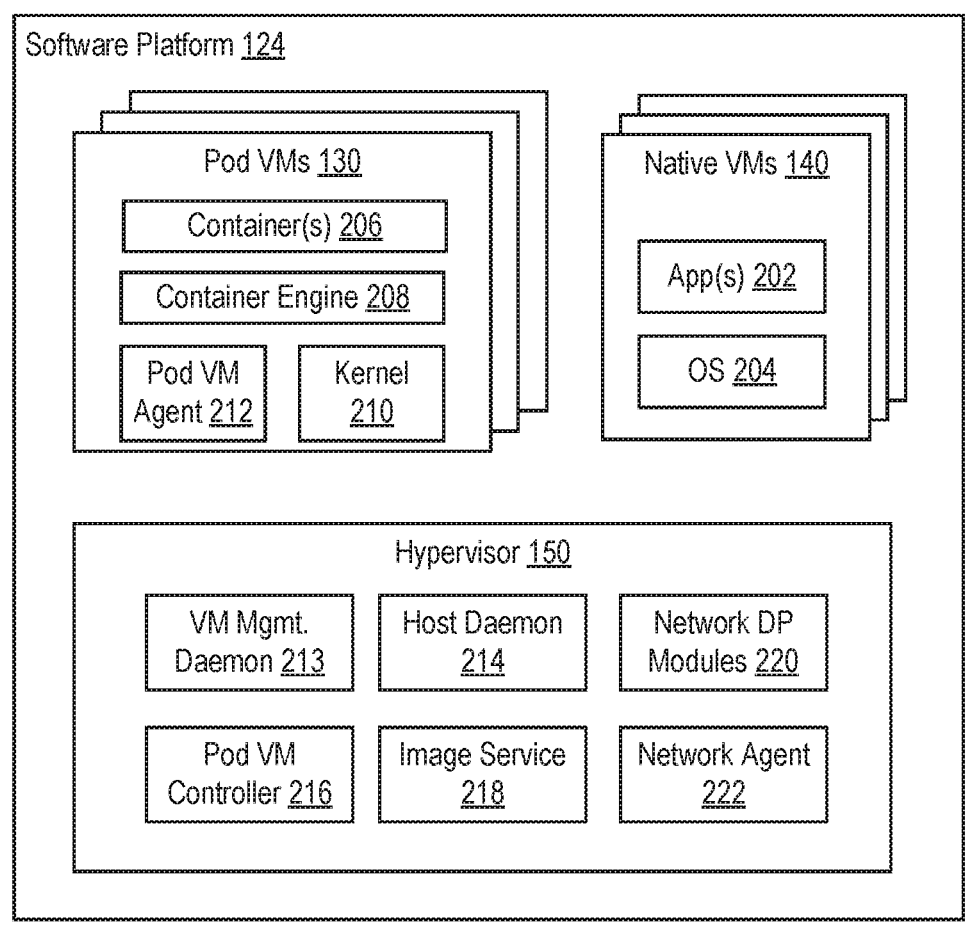
FIG. 2 is a block diagram depicting a software platform and shared storage according an embodiment.

FIG. 2 is a block diagram depicting software platform 124 according an embodiment. As described above, software platform 124 of host 120 includes hypervisor 150 that supports execution of VMs, such as pod VMs 130 and native VMs 140. In an embodiment, hypervisor 150 includes a VM management daemon 213, a host daemon 214, a pod VM controller 216, an image service 218, network DP modules 220, and network agents 222. VM management daemon 213 is a control plane agent 152 of server virtualization CP 117. VM management daemon 213 provides an interface to host daemon 214 for virtualization management server 116. Host daemon 214 is configured to create, configure, and remove VMs (e.g., pod VMs 130 and native VMs 140).

Pod VM controller 216 is a control plane agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to download and extract container images to shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 is omitted if host cluster 118 is not enabled as a supervisor cluster 101.

Network agents 222 comprises control plane agents 152 of logical network CP 119. Network agents 222 are configured to cooperate with network manager 112 to control network DP modules 220 to implement logical network services. Network agents 222 and network DP modules 220 configure the respective host as a transport node in a cluster 103 of transport nodes. Network DP modules 220 augment the network virtualization functionality of hypervisor 150.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130 are omitted if host cluster 118 is not enabled as a supervisor cluster 101.

Figure 3:
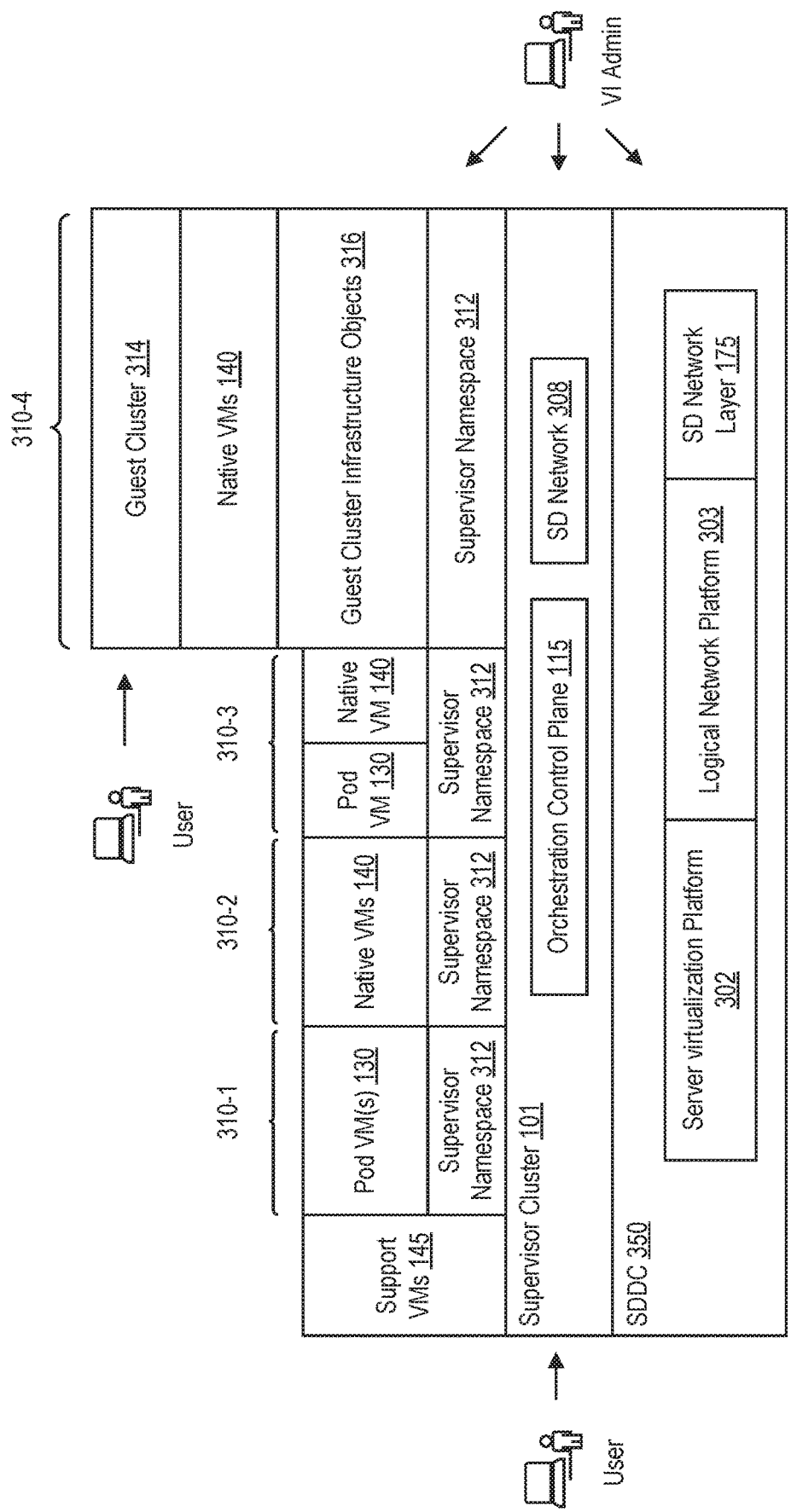
FIG. 3 is a block diagram depicting a logical view of a virtualized computing system having applications executing therein according to an embodiment.

FIG. 3 is a block diagram depicting a logical view of virtualized computing system 100 having applications executing therein according to an embodiment. In the embodiment, supervisor cluster 101 is implemented by an SDDC 350. SDDC 350 includes a server virtualization platform 302 and a logical network platform 303. Server virtualization platform 302 comprises host clusters 118, a virtualization layer (e.g., hypervisors 150), and server virtualization control plane 117 (e.g., virtualization management server 116). Logical network platform 303 comprises network manager 112 and associated components in the virtualization layer (e.g., CP agents and DP agents). Server virtualization platform 302 cooperates with logical network platform 303 to orchestrate SD network layer 175. Server virtualization control plane 117 (e.g., virtualization management server 116) provides a single entity for orchestration of compute, storage, and network.

In some embodiments, a VI admin interacts with virtualization management server 116 to configure SDDC 350 to implement supervisor cluster 101 and an SD network 308 in supervisor cluster 101. SD network 308 includes deployed virtualized infrastructure (e.g., distributed switch, port groups, resource pools, support VMs 145) and logical network services implemented thereon (e.g., logical switching, logical routing, etc.).

Supervisor cluster 101 includes orchestration control plane 115, which includes supervisor Kubernetes master(s) 104 and pod VM controllers 216. The VI admin interacts with Virtualization management server 116 to create supervisor namespaces 312. Each supervisor namespace 312 includes a resource pool and authorization constraints. The resource pool includes various resource constraints on supervisor namespace 312 (e.g., reservation, limits, and share (RLS) constraints). Authorization constraints provide for which roles are permitted to perform which operations in supervisor namespace 312 (e.g., allowing VI admin to create, manage access, allocate resources, view, and create objects; allowing DevOps to view and create objects; etc.). A user interacts with supervisor Kubernetes master 104 to deploy applications 310 on supervisor cluster 101 within scopes of supervisor namespaces 312. In the example, the user deploys an application 310-1 on pod VM(s) 130, an application 310-2 on native VMs 140, and application 310-3 on both a pod VM 130 and a native VM 140.

In embodiments, the user also deploys a guest cluster 314 on supervisor cluster 101 within a supervisor namespace 312 to implement a Kubernetes cluster. Guest cluster 314 is constrained by the authorization and resource policy applied by the supervisor namespace in which it is deployed. Orchestration control plane 115 includes guest cluster infrastructure software (GCIS) configured to realize guest cluster 314 as a virtual extension of supervisor cluster 101. The GCIS creates and manages guest cluster infrastructure objects 316 to provide abstract and physical representations of infrastructure supporting guest cluster 314. The GCIS executes in orchestration control plane 115 (e.g., in supervisor Kubernetes master 104). A user can interact with the Kubernetes control plane in guest cluster 314 to deploy various containerized applications (an application 310-4). Applications 310 can communicate with each other or with an external network through SD network 308.

As noted above, in some embodiments, SDDC 350 is not enabled as a supervisor cluster 101. In such case, SD network 308 is generally deployed in SDDC 350 for use by the workloads executing therein. Supervisor cluster 101, orchestration control plane 115, supervisor namespaces 312, guest cluster infrastructure objects 316, guest cluster 314, and pod VMs 130 can be omitted from the logical view shown in FIG. 3. Thus, SDDC 350 can generally support execution of native VMs 140, which utilize an SD network 308 orchestrated by server virtualization platform 302 as described herein.

Figure 4:
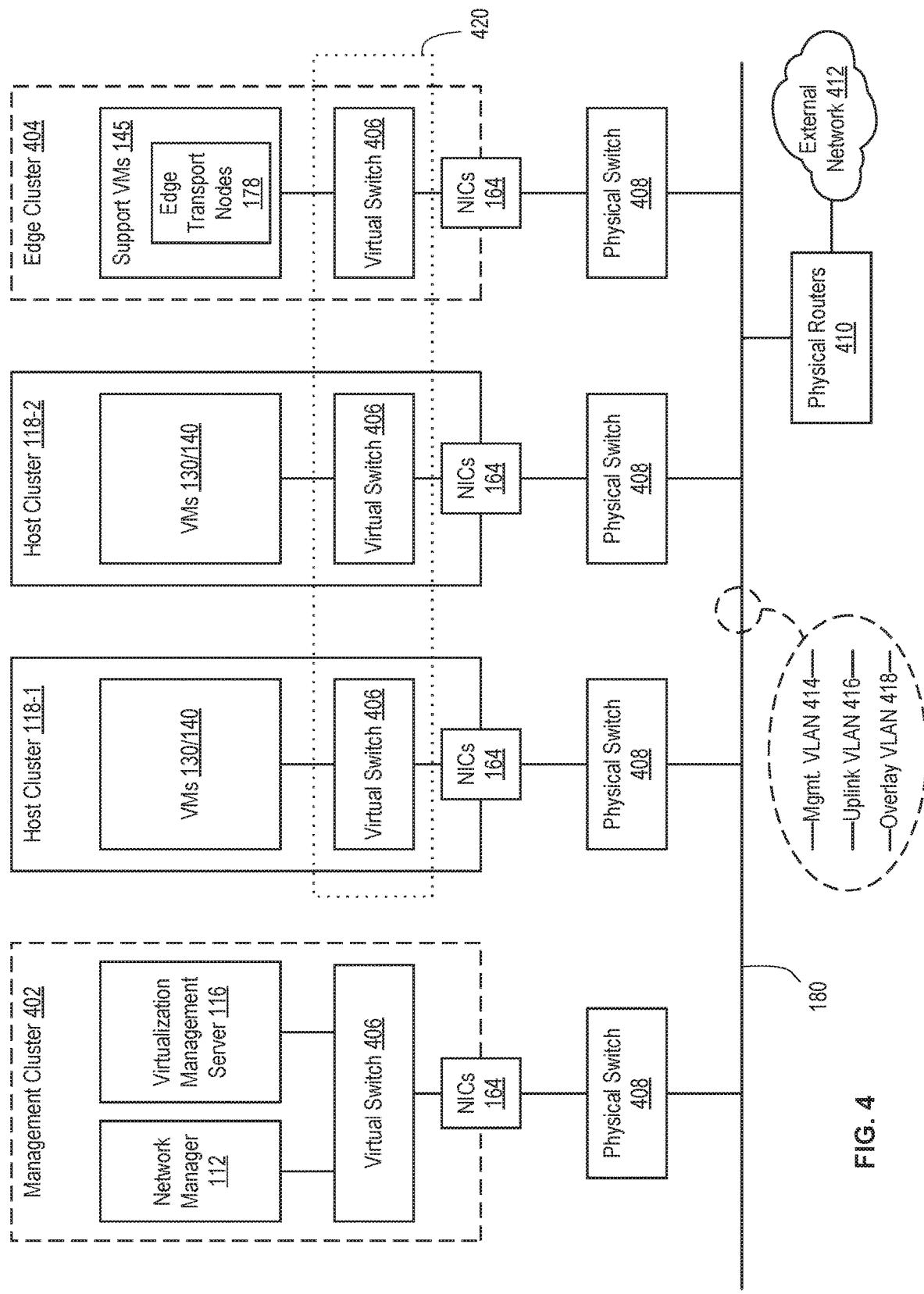
FIG. 4 is a block diagram depicting networked host clusters in a virtualized computing system according to an embodiment.

FIG. 4 is a block diagram depicting networked host clusters in virtualized computing system 100 according to an embodiment. In the example shown, virtualized computing system 100 includes two host clusters 118-1 and 118-2, each configured the same or similar as host cluster 118 shown in FIG. 1. Each host cluster 118-1 and 118-2 includes VMs 130/140 executing therein. Each VM 130/140 includes one or more virtual network interfaces to port(s) on a virtual switch 406. Virtual switch 406 includes ports coupled to NICs 164. NICs 164 are coupled to physical switches 408 on physical network 180. Physical network 180 includes one or more physical routers 410. Physical routers 410 are coupled between physical network 180 and an external network 412, such as a wide area network (WAN) (e.g., the public Internet).

In an embodiment, network manager 112 and virtualization management server 116 comprise VMs in a management cluster 402. Management cluster 402 is a logical cluster implemented within a host cluster 118. For example, management cluster 402 can be implemented within another host cluster 118 in addition to host cluster 118-1 and 118-2. In another example, management cluster 402 can be implemented within one of host cluster 118-1 or 118-2. Network manager 112 and virtualization management server 116 have virtual network interfaces coupled to ports on a virtual switch 406 same as VMs 130/140.

In an embodiment, support VMs 145 that include edge transport nodes 178 form an edge cluster 404. Edge cluster 404 is a logical cluster implemented within a host cluster 118. For example, edge cluster 404 can be implemented in another host cluster 118 in addition to host cluster 118-1 and 118-2. In another example, edge cluster 404 can be implemented within one of host cluster 118-1 or 118-2. Support VMs 145, including edge transport nodes 178, have virtual network interfaces coupled to ports on a virtual switch 406 same as VMs 130/140, network manager 112, and virtualization management server 116.

VMs 130/140 exchange data among themselves over physical network 180 within L2 networks (L2 broadcast domains) referred to herein as "segments." A virtual local area network backed (VLAN-backed) segment (also referred to as VLAN network or VLAN) is an L2 broadcast domain that is implemented as a traditional VLAN on physical network 180. In the example shown, physical network 180 includes three VLAN-backed segments: a management VLAN-backed segment (management VLAN 414); an uplink VLAN-backed segment (uplink VLAN 416); and an overlay VLAN-backed segment (overlay VLAN 418). Ports on a virtual switch 406 can be associated with a specific VLAN-backed segment of physical network 180.

For example, network manager 112, virtualization management server 116, and edge transport nodes 178 can be coupled to ports on respective virtual switches 406 that are associated with management VLAN 414. This allows communication of management traffic among network manager 112, virtualization management server 116, and edge transport nodes 178. Although not specifically shown, components in hypervisor 150 within each host 120 can be coupled to management VLAN 414 through a virtual switch 406 (e.g., control plane agents 152, pod VM controllers 216, etc.). Edge transport nodes 178 can also be coupled to ports on virtual switch 406 associated with uplink VLAN 416. Traffic on uplink VLAN 416 is routable to external network 412 via physical routers 410. Uplink VLAN 416 carries north-south traffic between host clusters 118 and external network 412.

VMs 130/140 and edge transport nodes 178 can be coupled to ports on respective virtual switches 406 associated with overlay VLAN 418. Overlay VLAN 418 carries east-west traffic between VMs 130/140. Overlay VLAN 418 supports overlay-backed segments or "logical segments." A logical segment is a logical L2 network between VMs using L2-over-L3 tunnels through overlay VLAN 418. Example tunneling protocols include VXLAN and Geneve. A logical segment is realized by deploying a logical switch. Overlay VLAN 418 can carry traffic associated with a plurality of different logical segments, each being a different logical network in an SD network. To support logical segments, virtual switches 406 are part of a distributed switch 420 that spans the hosts for which communication is desired. In the example, distributed switch 420 includes virtual switches 406 in each of host cluster 118-1, 118-2, and edge cluster 404. This allows VMs in host cluster 118-1 to exchange data with VMs in host cluster 118-2 through logical networks on the overlay network (overlay VLAN 418). This also allows VMs in either host cluster 118-1 or host cluster 118-2 reach external network 412 through edge transport nodes 178.

Figure 5:
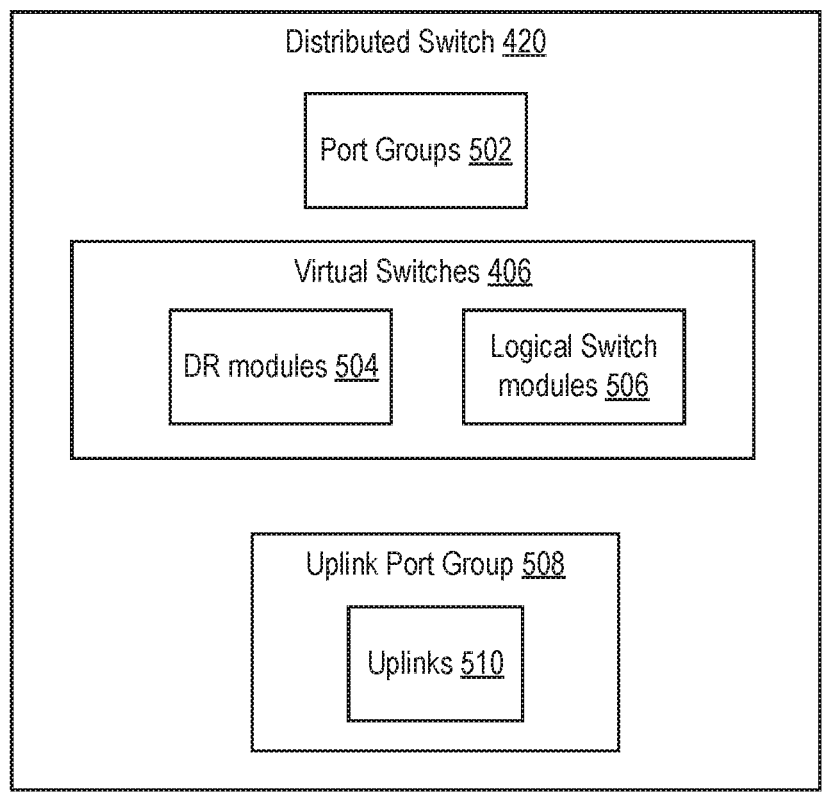
FIG. 5 is a block diagram depicting a distributed switch according to an embodiment.

FIG. 5 is a block diagram depicting a distributed switch 420 according to an embodiment. Distributed switch 420 includes one or more port groups 502 and an uplink port group 508. Uplink port group 508 includes one or more uplinks 510. Each port group 502 can be associated with a VLAN-backed segment of physical network 180. VMs connected to a port group 502 send and receive traffic over the particular VLAN-backed segment associated with that port group 502. Each uplink 510 is associated with one or more NICs 164. A port group 502 can be assigned an uplink 510 to allow ingress to and egress from hosts 120 in which distributed virtual switch 406 is deployed. Virtualization management server 116 pushes out port groups 502 and uplinks 510 to each virtual switch 406. In transport nodes, virtual switches 406 that implement distributed switch 420 are augmented with distributed router (DR) modules 504 and logical switch modules 506, which are part of the data plane of the logical network platform. DR modules 504 implement one or more DRs of an SD network. A DR is an L3 logical device that routes between overlay-backed segments (logical networks). A logical switch implements an overlay-backed segment (logical network).

Figure 6A:
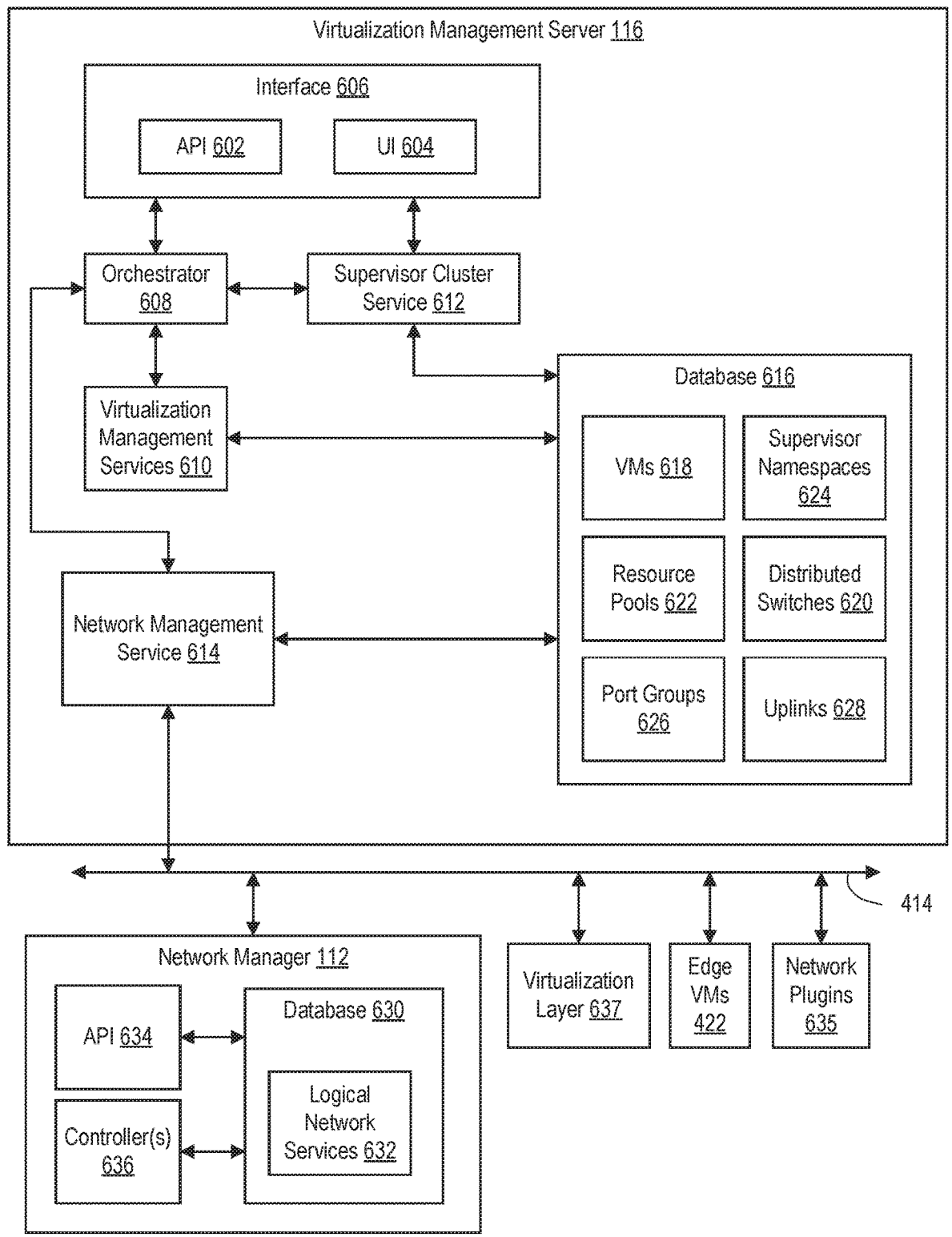
FIG. 6A is a block diagram depicting a virtualization management server in communication with a network manager according to an embodiment.

FIG. 6A is a block diagram depicting a virtualization management server 116 in communication with a network manager 112 according to an embodiment. Virtualization management server 116 includes an interface 606, an orchestrator 608, a supervisor cluster service 612, virtualization management services 610, a network management service 614, and a database 616. Network manager 112 includes an API 634, controller(s) 636, and a database 630. Interface 606 includes an API 602 and a user interface (UI) 604.

A VI admin interacts with virtualization management server 116 through interface 606, either using API 602 directly or through UI 604 (e.g., a web interface). Interface 606 allows VI Admin to perform various operations, such as create host clusters, add hosts to host clusters, VM lifecycle management, create resource pools, enable supervisor clusters, create VSANs, and the like. In embodiments, a VI admin can supply a declarative specification for an SD network through interface 606. In embodiments, orchestrator 608 is the primary component responsible for collecting user input and invoking various services in response thereto. Orchestrator 608 can invoke network management service 614 to manage SD network layer 175. Orchestrator 608 can invoke various other virtualization management services 610 for other tasks (e.g., cluster creation, host management, VM lifecycle management, resource pool management, etc.). The various services of virtualization management server 116 store objects in database 616. Example objects include VMs 618, distributed switches 620, resource pools 622, supervisor namespaces 624, port groups 626, and uplinks 628. In embodiments, a user interacts with supervisor cluster service 612 through interface 606 to enable host cluster 118 as a supervisor cluster 101. Supervisor cluster service 612 invokes orchestrator 608 to manage SD network layer 175 on its behalf. Orchestrator 608 then functions as described above to manage SD network layer 175.

Orchestrator 608 provides a declarative specification describing a proposed state of SD network layer 175 to network management service 614. Orchestrator 608 can receive the declarative specification directly from a VI admin or from another service, such as supervisor cluster service 612. Network management service 614 is in communication with network manager 112 over management VLAN 414 and cooperates with network manager 112 through API 634. In embodiments, network management service 614 provides a proxy for API calls to API 634 of network manager 112. For example, if declarative specification calls for deployment of logical switches and logical routers, network management service 614 can generate the API calls to API 634 of network manager 112 to orchestrate the deployment of such logical network services.

In embodiments, network management service 614 performs functions in addition to proxying API calls to network manager 112. Network management service 614 can deploy virtualized infrastructure components that support logical network services in response to the declarative specification. For example, network management service 614 can deploy resource pools 622, distributed switches 620, port groups 626, uplinks 628, and VMs 618 to bring the current state of SD network layer 175 to the proposed state in the declarative specification. If the proposed state requires deployment of logical network services, network management service 614 then invokes API 634 of network manager 112 to deploy those logical network services supported by the provisioned virtualized infrastructure components.

Network manager 112 maintains state of deployed logical network services of SD network layer 175 in database 630. Database 630 can track various logical network services 632, such as logical switches, logical routers, logical firewalls, logical VPNs, logical load balancers, edge services, and the like. Controller(s) 636 provide the control function of logical network layer and cooperate with control agents in a virtualization layer 637 (e.g., hypervisors 150), edge transport nodes 178, and network plugins 635 to deploy and manage the logical network services. Network plugins 635 comprise software executing in orchestration control plane 115 or applications executing on host cluster 118 that self-request deployment/configuration of logical network services in SD network layer 175.

Figure 6B:
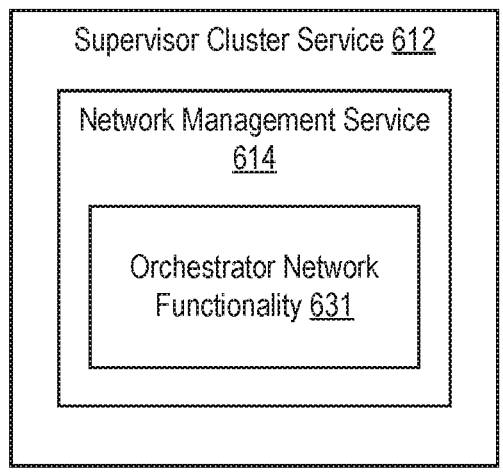
FIGS. 6B and 6C are block diagrams depicting alternative configurations of network orchestrator, a network management service, and a supervisor cluster service according to embodiments.
Figure 6C:
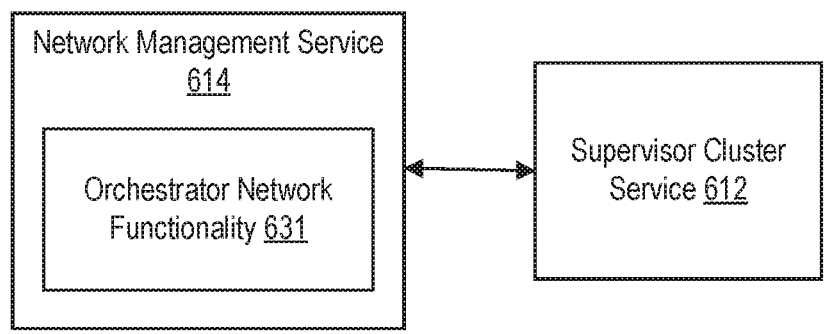

FIGS. 6B and 6C are block diagrams depicting alternative configurations of orchestrator 608, network management service 614, and supervisor cluster service 612 according to embodiments FIG. 6B shows an example where orchestrator network functionality 631 is incorporated into network management service 614, rather than as part of orchestrator 608. Further, network management service 614 is incorporated into supervisor cluster service 612. The VI admin interacts with supervisor cluster service 612 through interface 606, which then deploys and manages supervisor clusters and associated SD networking. FIG. 6C shows an example where orchestrator network functionality 631 is incorporated into network management service 614, rather than as part of orchestrator 608. Network management service 614 remains apart from supervisor cluster service 612. Supervisor cluster service 612 interacts with network management service 614 to orchestrate and manage SD networking for supervisor clusters. An VI admin can also interact with network management service 614 through interface 606 to manage SD networking for other host clusters.

Figure 7:
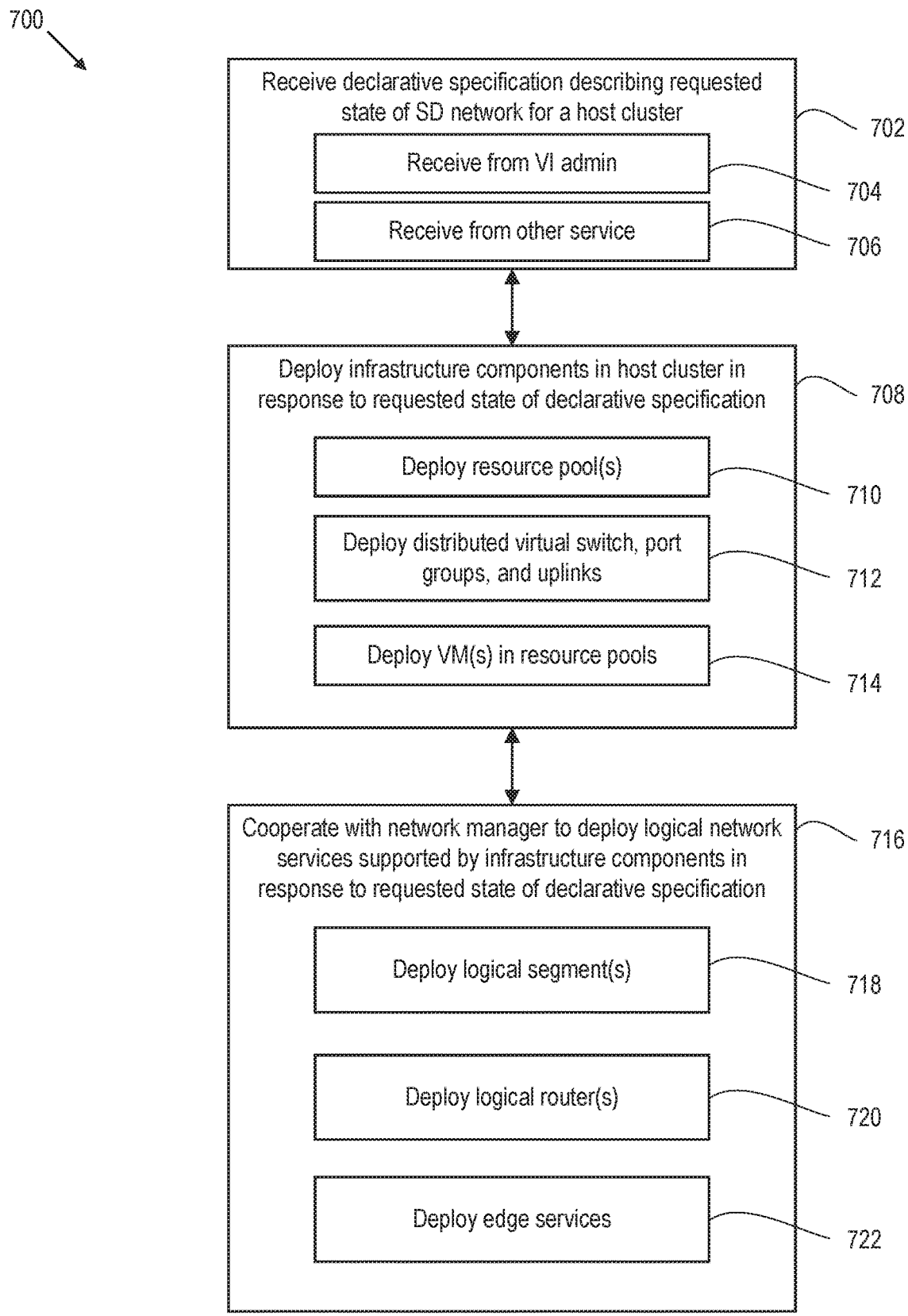
FIG. 7 is a flow diagram depicting a method of orchestrating a software-defined (SD) network layer of a virtualized computing system according to an embodiment.

FIG. 7 is a flow diagram depicting a method 700 of orchestrating SD network layer 175 of virtualized computing system according to an embodiment. Method 700 can be performed by virtualization management server 116, which comprises software executing on CPU, memory, storage, and network resources managed by a virtualization layer (e.g., a hypervisor) or a host OS. As described above, virtualized computing system 100 includes host cluster 118, virtualization management server 116, and network manager 112 each connected to physical network 180. Host cluster 118 includes hosts 120 having a virtualization layer (e.g., hypervisor 15) executing on hardware platforms 122.

Method 700 begins at step 702, where virtualization management server 116 receives a declarative specification describing a proposed state of SD network layer 175 for host cluster 118. The declarative specification can be input directly by a VI admin (step 704) or provided by another service, (706), such as supervisor cluster service 612 requesting an SD network for supervisor cluster 101. For example, a VI admin can perform some pre-orchestration steps, such as forming host cluster 118 and deploying a distributed switch 420. Then VI admin can generate a declarative specification that identifies host cluster 118 and distributed switch 420, describes networks to be deployed (e.g., management network, overlay network), and describes a gateway and a plurality of network segments connected to the gateway. In another example, VI admin can enable create host cluster 118 and enable host cluster 118 as supervisor cluster 101. Supervisor cluster service 612 supplies a declarative specification describing the virtualized infrastructure and logical network services necessary to support workloads in supervisor cluster, such as a distributed switch, port groups for VLAN networks, uplinks, resource pools, VMs for edge transport nodes, and edge services to be deployed in the edge transport nodes.

At step 708, virtualization management server 116 deploys virtualized infrastructure in host cluster 118 in response to the proposed state of the declarative specification. For example, virtualization management server 116 can deploy resource pool(s) (710), deploy a distributed switch, port groups, and uplinks (712), and deploy VM(s) in the resource pool(s)(714). For example, a declarative specification can describe VLAN networks and edge services for an SD network. In response, virtualization management server 116 (e.g., network management service 614) deploys a port group for each VLAN network, uplinks connecting physical NICs to the port groups, and a resource pool of compute and memory, and VMs in the resource pool for hosting the described edge services (e.g., a service gateway/router).

At step 716, virtualization management server 116 cooperates with network manager 112 to deploy logical network services supported by the virtualized infrastructure in response to the proposed state of the declarative specification. For example, virtualization management server 116 can cooperate with network manager 112 to deploy logical segment(s) on the distributed switch (718), deploy logical router(s) on the distributed switch (720), and deploy edge services in the VM(s) (722). For example, a declarative specification can describe an SD network for supervisor cluster 101, including a Tier-0 gateway to provide edge services and a Tier-1 router to provide a gateway for multiple logical segments associated with supervisor namespaces. Virtualization management server 116 (e.g., network management service 614) cooperates with network manager 112 to deploy the Tier-0 gateway in edge transport nodes, and a DR to implement the Tier-1 router. Virtualization management server 116 (e.g., network management service 614) performs steps 708 and 716 to bring the state of SD network layer 175 for host cluster 118 to the proposed state in declarative specification.

Figure 8A:
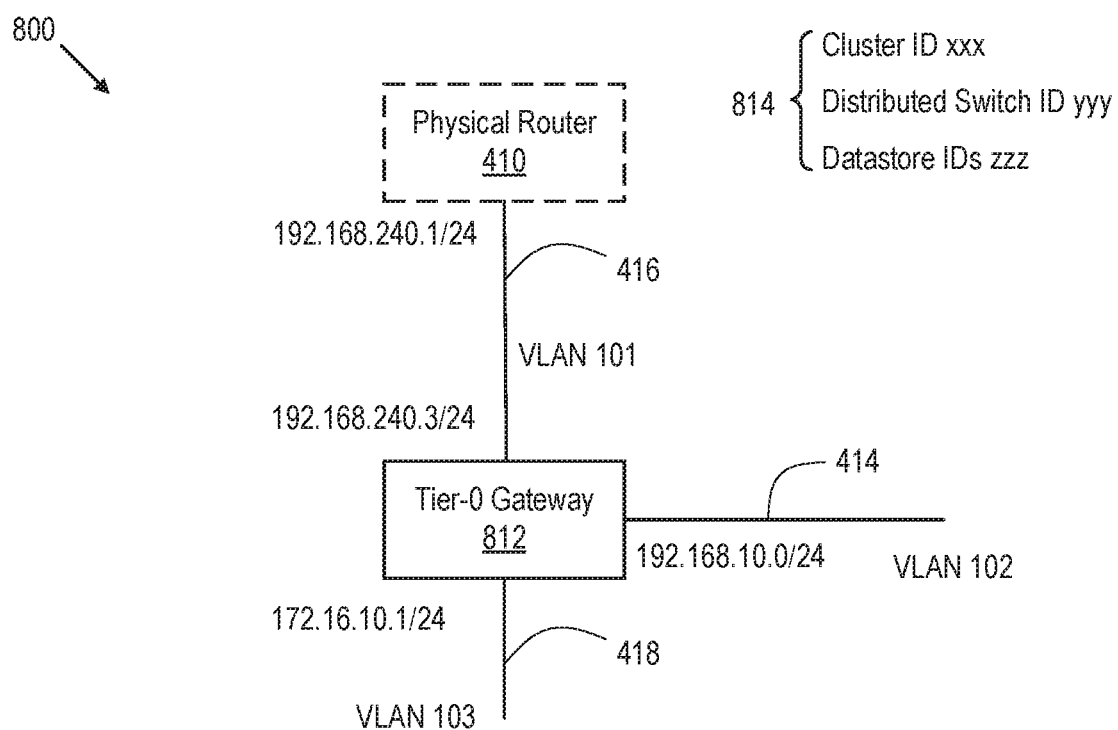
FIG. 8A is a block diagram graphically depicting a declarative specification for a proposed state of an SD network layer according to an embodiment.

FIG. 8A is a block diagram graphically depicting a declarative specification 800 for a proposed state of SD network layer 175 according to an embodiment. Declarative specification 800 can be generated by supervisor cluster service 612 to provide a base SD network for supporting workloads in supervisor cluster 101. Declarative specification 800 defines some metadata 814, such as a cluster ID, distributed switch ID, datastore IDs, etc. Declarative specification 800 also defines three VLAN-backed segments, namely, uplink VLAN 416, management VLAN 414, and overlay VLAN 418. Declarative specification 800 defines VLAN ID and Internet Protocol (IP) information for each of uplink VLAN 416, management VLAN 414, and overlay VLAN 418. Uplink VLAN 416 connects Tier-0 gateway 812 to physical router 410 (which is not part of declarative specification 800). Management VLAN 414 connects Tier-0 gateway 812 to network manager 112. Tier-0 gateway is connected to overlay VLAN 418 to provide a downlink for access by workloads that will be deployed in supervisor cluster 101.

Figure 8B:
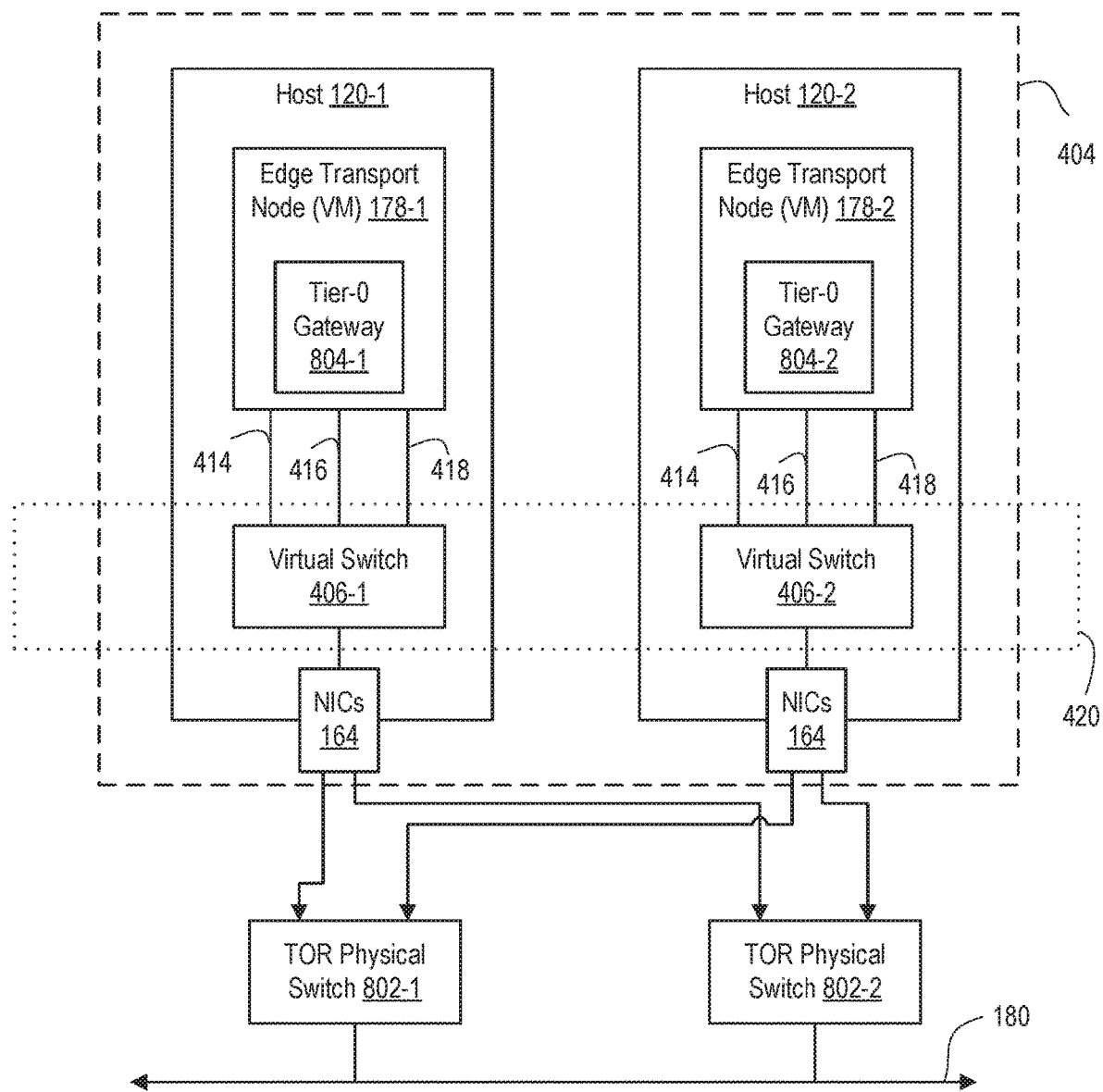
FIG. 8B is a block diagram depicting virtualized infrastructure and logical network services implemented in response to the declarative specification of FIG. 8A according to an embodiment.

FIG. 8B is a block diagram depicting virtualized infrastructure and logical network services implemented in response to declarative specification 800 according to an embodiment. As shown, edge cluster 404 is deployed in hosts 120-1 and 120-2. Edge cluster 404 includes edge transport nodes 178-1 and 178-2, which are implemented as VMs. Network management service 614 deploys the edge transport nodes 178-1 and 178-2 with anti-affinity rules on two different hosts 120-1 and 120-2. Each edge transport node 178-1 and 178-2 connect to three different VLAN-backed segments, namely, management VLAN 414, uplink VLAN 416, and overlay VLAN 418. Each edge transport node 178-1 and 178-2 implements a Tier-0 gateway 804-1 and 804-2, respectively. Edge transport nodes 178-1 and 178-2 are configured in pairs per supervisor cluster 101 in an active-passive configuration. This allows for high availability of the Tier-0 gateway so that a single point of failure is avoided. Further, edge cluster 404 is configured at the cluster level, which allows traffic isolation between two supervisor clusters. Network management service 614 can create a resource pool for edge transport nodes 178-1 and 178-2 to guarantee that the provided network services have enough resources for continuous, uninterrupted execution.

Edge transport nodes 178-1 and 178-2 are configured as part of an overlay transport zone via a dedicated VLAN ID and port group on virtual switches 406-1 and 406-2 (e.g., overlay VLAN 418). This supports traffic flow between the transport nodes in the supervisor cluster (and the workloads executing thereon) and edge transport nodes 178-1 and 178-2 (e.g., overlay traffic). Tunnel endpoint interfaces of edge transport nodes 178-1 and 178-2, which are used for overlay traffic, are tagged with the user-provided VLAN ID (e.g., VLAN ID #103). The network interface for overlay VLAN 418 is auto-assigned an IP address from the user provided IP pool (e.g., 172.16.10.1/24).

Edge transport nodes 178-1 and 178-2 are configured to use a port group for management traffic over management VLAN 414 to and from network manager 112. Network manager 112 uses management VLAN 414 to configure Tier-0 gateways 804-1 and 804-2 and the services provided by the gateways.

Edge transport nodes 178-1 and 178-2 are also connected to the uplink VLAN 416 through a port group on virtual switch 406-1 and 406-2, respectively. This supports traffic flow between edge transport nodes 178-1 and 178-2 and an external network via tier-0 gateways 804-1 and 804-2. Each tier-0 gateway includes a static IP configuration provided by declarative specification 800 (e.g., 192.168.240.3/24). The traffic on uplink VLAN 416 is tagged with the user-provided VLAN ID (e.g., VLAN ID #101). Virtual switches 406-1 and 406-2 are part of distributed switch 420, which include definitions for the port groups and unlinks. NICs 164 on hosts 120-1 and 120-2 can be connected to dual Top-of-Rack (TOR) physical switches 802-1 and 802-2, through which Tier-0 gateways 804-1 and 804-2 send and receive uplink traffic and overlay traffic. Other transport nodes that host the intended workloads are omitted from FIG. 8B for clarity.

Figure 9:
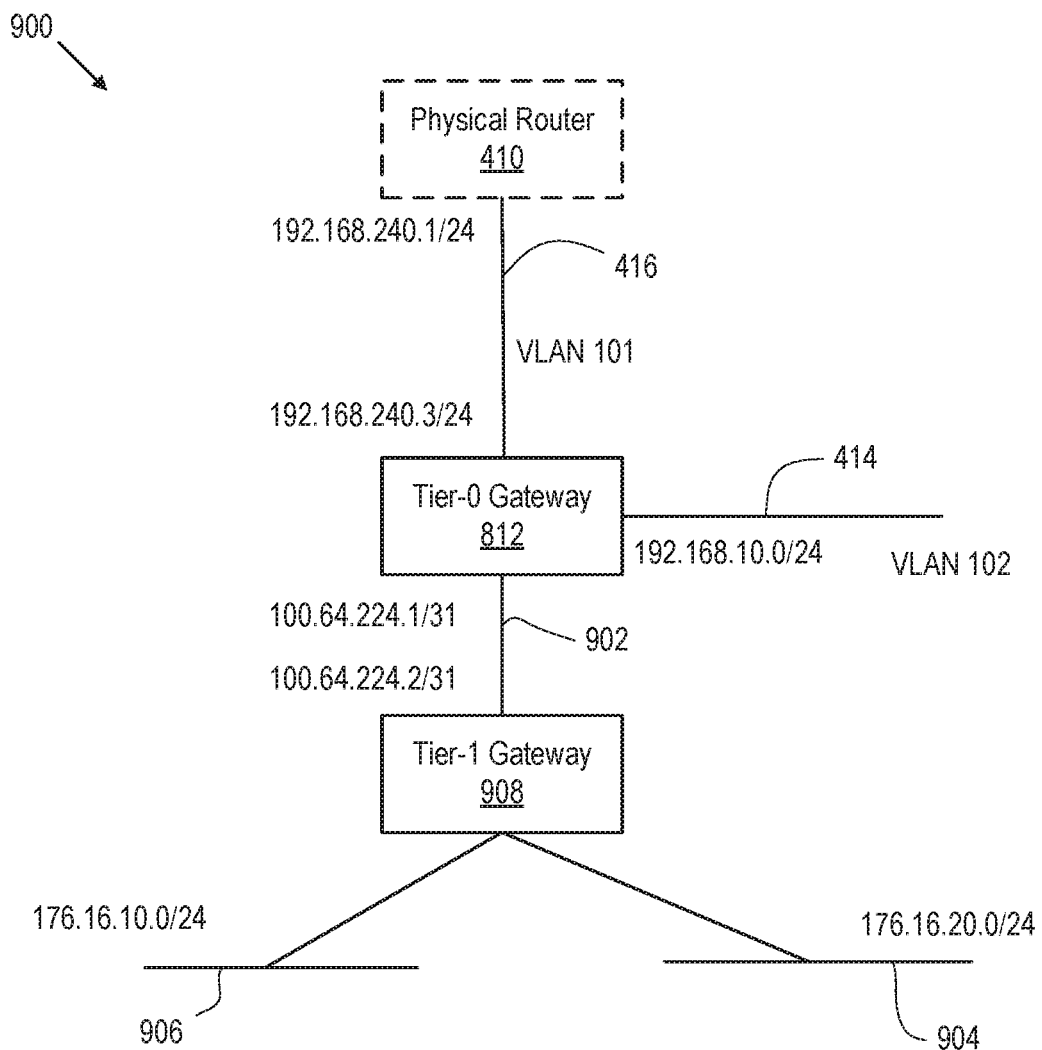
FIG. 9 is a block diagram depicting a logical view of the SD network layer according to an embodiment after deployment of workloads.

FIG. 9 is a block diagram depicting a logical view of SD networking layer 175 for a supervisor cluster 101 after deployment of workloads according to an embodiment. The structure builds on the virtualized infrastructure and logical network services shown in FIG. 8B. As shown, tier-0 gateway 812 is connected to a tier-1 gateway 908 over a logical segment 902. Tier-1 gateway is connected to two different logical segments 904 and 906. Each logical segment 904 and 906 can correspond to a separate supervisor namespace in supervisor cluster 101. Workloads connect to one of logical segments 904 and 906 depending on in which supervisor namespace they are deployed. Additional logical segments can be deployed to support additional supervisor namespaces. Tier-1 gateway 908 serves as the gateway for each of the logical segments. Tier-1 gateway 908 can be implemented as a DR within the virtualization layer across the hosts. Tier-0 gateway 812 serves as the gateway for Tier-1 gateway 908. Each of logical segments 902, 904, and 906 are supported by logical switches using overlay VLAN 918. The additional logical network services shown in FIG. 9 can be deployed according to a declarative specification provided by supervisor cluster service 612, for example. Alternatively, a network plugin 635 can submit a declarative specification to virtualization management server 116 to deploy the additional logical switches and tier-1 gateway. In either case, the new declarative specification proposes a new state of SD network layer 175, which network management service 614 achieves in cooperation with network manager 112.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of orchestrating a software-defined (SD) network layer of a virtualized computing system, the virtualized computing system including a host cluster, a virtualization management server, and a network management server each connected to a physical network, the network management server being deployed in a separate physical or virtual server from the virtualization management server, the host cluster having hosts and a virtualization layer executing on hardware platforms of the hosts, the method comprising:
receiving, at the virtualization management server, a declarative specification describing a proposed state of an SD network for the host cluster;
deploying, by a network management service executing in the virtualization management server, virtualized infrastructure components in the host cluster needed to implement the SD network described in the declarative specification, the virtualized infrastructure including a resource pool, at least one virtual machine (VM) deployed in the resource pool, and a distributed switch deployed in the virtualization layer; and
deploying, by the network management service in cooperation with the network management server, logical network services of the SD network on the virtualized infrastructure components, the logical network services including a logical switch deployed on the distributed switch and edge services deployed in the at least one VM.

2. The method of claim 1, wherein the virtualized infrastructure components include port groups on the distributed switch, the port groups implementing networks defined in the declarative specification.

3. The method of claim 2, wherein the declarative specification describes virtual local area network (VLAN) identifiers for the networks, and wherein each of the port groups is associated with a respective one of the VLAN identifiers.

4. The method of claim 2, wherein each of the at least one virtual machine connected to at least one of the port groups on the distributed switch, each of the at least one virtual machine having at least one virtual network interface having an Internet Protocol (IP) address defined in the declarative specification.

5. The method of claim 4, wherein the logical network services include gateway executing in a first VM of the at least one VM, wherein the networks defined in the declarative specification include a management network, an overlay network, and an uplink network, wherein the port groups include a first port group implementing the management network, a second port group implementing the overlay network, and a third port group implementing the uplink network, and wherein the gateway is connected to each of first, second, and third port groups.

6. The method of claim 4, wherein the logical network services include a tier-0 gateway executing in a first VM of the at least one VM, a tier-1 gateway implemented as a distributed router in the distributed switch, the tier-1 gateway connected to the tier-0 gateway, and at least one logical switch, implemented in the distributed switch, connected to the tier-1 gateway.

7. The method of claim 1, wherein the network management service orchestrates the deployment of the virtualized infrastructure components and the logical network services, the network management service performing the step of deploying the logical network services by invoking an application programming interface (API) of the network management server.

8. The method of claim 1, wherein the virtualization management server includes an orchestration service, wherein the orchestration service is configured to receive the declarative specification and cooperate with the network management service to perform the steps of deploying the virtualized infrastructure components and deploying the logical network services, the network management service invoking an application programming interface (API) of the network management server.

9. The method of claim 8, wherein the virtualization management server includes a supervisor cluster service configured to deploy an orchestration control plane integrated with the virtualization layer, wherein the supervisor cluster service provides the declarative specification to the orchestration service.

10. The method of claim 1, wherein the virtualization management server includes a supervisor cluster service configured to deploy an orchestration control plane integrated with the virtualization layer, wherein the supervisor cluster service provides the declarative specification to the network management service, and wherein the network management service orchestrates the deployment of the virtualized infrastructure components and the logical network services, the network management service performing the step of deploying the logical network services by invoking an application programming interface (API) of the network management server.

11. A non-transitory computer readable medium comprising instructions to be executed in a computing device to cause the computing device to carry out a method of orchestrating a software-defined (SD) network layer of a virtualized computing system, the virtualized computing system including a host cluster, a virtualization management server, and a network management server each connected to a physical network, the network management server being deployed in a separate physical or virtual server from the virtualization management server, the host cluster having hosts and a virtualization layer executing on hardware platforms of the hosts, the method comprising:
  receiving, at the virtualization management server, a declarative specification describing a proposed state of an SD network for the host cluster;
  deploying, by a network management service executing in the virtualization management server, virtualized infrastructure components in the host cluster needed to implement the SD network described in the declarative specification, the virtualized infrastructure including a resource pool, at least one virtual machine (VM) deployed in the resource pool, and a distributed switch deployed in the virtualization layer; and
  deploying, by the network management service in cooperation with the network management server, logical network services of the SD network on the virtualized infrastructure components, the logical network services including a logical switch deployed on the distributed switch and edge services deployed in the at least one VM.

12. The non-transitory computer readable medium of claim 11, wherein:
  the virtualized infrastructure components include port groups on the distributed switch, the port groups implementing networks defined in the declarative specification; and
  wherein each of the at least one virtual machine connected to at least one of the port groups on the distributed switch, each of the at least one virtual machine having at least one virtual network interface having an Internet Protocol (IP) address defined in the declarative specification.

13. The non-transitory computer readable medium of claim 11, wherein the network management service orchestrates the deployment of the virtualized infrastructure components and the logical network services, the network management service performing the step of deploying the logical network services by invoking an application programming interface (API) of the network management server.

14. The non-transitory computer readable medium of claim 11, wherein the virtualization management server includes an orchestration service, wherein the orchestration service is configured to receive the declarative specification and cooperate with the network management service to perform the steps of deploying the virtualized infrastructure components and deploying the logical network services, the network management service invoking an application programming interface (API) of the network management server.

15. The non-transitory computer readable medium of claim 14, wherein the virtualization management server includes a supervisor cluster service configured to deploy an orchestration control plane integrated with the virtualization layer, wherein the supervisor cluster service provides the declarative specification to the orchestration service.

16. The non-transitory computer readable medium of claim 11, wherein the virtualization management server includes a supervisor cluster service configured to deploy an orchestration control plane integrated with the virtualization layer, wherein the supervisor cluster service provides the declarative specification to the network management service, and wherein the network management service orchestrates the deployment of the virtualized infrastructure components and the logical network services, the network management service performing the step of deploying the logical network services by invoking an application programming interface (API) of the network management server.

17. A virtualized computing system, comprising:
a host cluster, a virtualization management server, and a network management server each connected to a physical network, the network management server being deployed in a separate physical or virtual server from the virtualization management server;
the host cluster including hosts and a virtualization layer executing on hardware platforms of the hosts;
the network management server configured to manage an SD network for the host cluster; and
the virtualization management server configured to:
receive a declarative specification describing a proposed state of an SD network for the host cluster;
deploying, by a network management service executing in the virtualization management server, virtualized infrastructure components in the host cluster needed to implement the SD network described in the declarative specification, the virtualized infrastructure including a resource pool, at least one virtual machine (VM) deployed in the resource pool, and a distributed switch deployed in the virtualization layer; and
deploying, by the network management service in cooperation with the network management server, logical network services of the SD network on the virtualized infrastructure components, the logical network services including a logical switch deployed on the distributed switch and edge services deployed in the at least one VM.

18. The virtualized computing system of claim 17, wherein:
the virtualized infrastructure components include port groups on the distributed switch, the port groups implementing networks defined in the declarative specification; and
wherein each of the at least one virtual machine connected to at least one of the port groups on the distributed switch, each of the at least one virtual machine having at least one virtual network interface having an Internet Protocol (IP) address defined in the declarative specification.

19. The virtualized computing system of claim 18, wherein the logical network services include a gateway executing in a first VM of the at least one VM, wherein the networks defined in the declarative specification include a management network, an overlay network, and an uplink network, wherein the port groups include a first port group implementing the management network, an second port group implementing the overlay network, and a third port group implementing the uplink network, and wherein the gateway is connected to each of the first, the second, and the third port groups.

20. The virtualized computing system of claim 18, wherein the logical network services include a tier-0 gateway executing in a first VM of the at least one VM, a tier-1 gateway implemented as a distributed router in the distributed switch, the tier-1 gateway connected to the tier-0 gateway, and at least one logical switch, implemented in the distributed switch, connected to the tier-1 gateway.

21. The virtualized computing system of claim 17, wherein a management function of the SD network is divided between the virtualization management server and the network management server, wherein a control function of the SD network is exclusively performed by the network management server, and wherein a data function of the SD network is performed by the virtualization layer.

* * * * *